(12) United States Patent
Nakamura

(10) Patent No.: US 9,871,388 B2
(45) Date of Patent: Jan. 16, 2018

(54) VOLTAGE EQUALIZATION APPARATUS AND ELECTRICITY STORAGE APPARATUS

(71) Applicant: Sony Corporation, Tokyo (JP)

(72) Inventor: Kazuo Nakamura, Kanagawa (JP)

(73) Assignee: Sony Corporation, Tokyo (JP)

( * ) Notice: Subject to any disclaimer, the term of this patent is extended or adjusted under 35 U.S.C. 154(b) by 336 days.

(21) Appl. No.: 14/636,634

(22) Filed: Mar. 3, 2015

(65) Prior Publication Data

US 2015/0256001 A1 Sep. 10, 2015

(30) Foreign Application Priority Data

Mar. 10, 2014 (JP) ................................ 2014-046321

(51) Int. Cl.
*H01M 10/44* (2006.01)
*H01M 10/46* (2006.01)
*H02J 7/00* (2006.01)

(52) U.S. Cl.
CPC .................... *H02J 7/0013* (2013.01)

(58) Field of Classification Search
CPC ...... H02J 7/0013; H02J 7/0021; H02J 7/0026; H02J 7/0027; H02J 7/0014
USPC ................. 320/104, 107, 119, 137, 141, 118
See application file for complete search history.

(56) References Cited

U.S. PATENT DOCUMENTS

| | | | |
|---|---|---|---|
| 2004/0130292 A1* | 7/2004 | Buchanan | B60L 11/1811 320/116 |
| 2008/0084184 A1 | 4/2008 | Ohnuki | |
| 2010/0032780 A1 | 2/2010 | Ang | |
| 2012/0306447 A1* | 12/2012 | Jeong | H02J 7/0016 320/116 |
| 2014/0191582 A1* | 7/2014 | Deboy | H02J 3/383 307/82 |

FOREIGN PATENT DOCUMENTS

| | | |
|---|---|---|
| EP | 2228883 | 9/2010 |
| JP | 2013-183557 | 9/2013 |
| WO | WO 2004/030177 | 4/2004 |
| WO | WO 2010/087608 | 8/2010 |
| WO | WO 2012/127270 | 9/2012 |

OTHER PUBLICATIONS

Extended European Search Report issued in EP Application 15152425.3 dated Aug. 11, 2015 (9 pages).

* cited by examiner

*Primary Examiner* — Edward Tso
(74) *Attorney, Agent, or Firm* — K&L Gates LLP

(57) ABSTRACT

A voltage equalization apparatus includes a switch controller controlling a first switch that is configured to provide a first voltage to a first rectifier element group corresponding to a first electricity storage member and controlling a second switch that is configured to provide a second voltage to a second rectifier element group corresponding to a second electricity storage member, and the switch controller is configured to individually control the first switch and the second switch based on voltage measurement signals of the first electricity storage member and the second electricity storage member.

24 Claims, 13 Drawing Sheets

VOLTAGE EQUALIZATION APPARATUS AND ELECTRICITY STORAGE APPARATUS

CROSS REFERENCES TO RELATED APPLICATIONS

The present application claims priority to Japanese Priority Patent Application JP 2014-046321 filed in the Japan Patent Office on Mar. 10, 2014, the entire content of which is hereby incorporated by reference.

BACKGROUND

The present disclosure relates to a voltage equalization apparatus and an electricity storage apparatus. More specifically, the present disclosure relates to a voltage equalization apparatus for equalizing voltages of a plurality of electricity storage members and an electricity storage apparatus.

From the past, a technology for equalizing voltages of a plurality of series-connected cells has been proposed. For example, Japanese Patent Application Laid-open No. 2013-183557 proposes an equalization circuit in which, to series-connected electricity storage cells, two series-connected diodes are connected in parallel, and a capacitor is connected to an intermediate point between the diodes.

SUMMARY

Equalization of voltages is desirably performed irrespective of a variation of characteristics of circuit elements.

In view of the circumstances as described above, it is desirable to provide a voltage equalization apparatus for appropriately performing voltage equalization irrespective of a variation of characteristics of circuit elements and an electricity storage apparatus.

According to an embodiment of the present disclosure, there is provided a voltage equalization apparatus includes a switch controller controlling a first switch that is configured to provide a first voltage to a first rectifier element group corresponding to a first electricity storage member and controlling a second switch that is configured to provide a second voltage to a second rectifier element group corresponding to a second electricity storage member, and the switch controller is configured to individually control the first switch and the second switch based on voltage measurement signals of the first electricity storage member and the second electricity storage member.

According to an embodiment of the present disclosure, there is provided an electricity storage apparatus including a first electricity storage member, a second electricity storage member connected in series with the first electricity storage member, and a switch controller configured to control a first switch that is configured to provide a first voltage to a first rectifier element group corresponding to a first electricity storage member and control a second switch that is configured to provide a second voltage to a second rectifier element group corresponding to a second electricity storage member, and the switch controller is configured to individually control the first switch and the second switch based on voltage measurement signals of the first electricity storage member and the second electricity storage member.

According to an embodiment of the present disclosure, there is provided a voltage equalization method including controlling, with a switch controller, a first switch that is configured to provide a first voltage to a first rectifier element group corresponding to a first electricity storage member, and controlling, with the switch controller, a second switch that is configured to provide a second voltage to a second rectifier element group corresponding to a second electricity storage member, wherein the switch controller individually controls the first switch and the second switch based on voltage measurement signals of the first electricity storage member and the second electricity storage member.

These and other objects, features and advantages of the present disclosure will become more apparent in light of the following detailed description of best mode embodiments thereof, as illustrated in the accompanying drawings.

Additional features and advantages are described herein, and will be apparent from the following Detailed Description and the figures.

DETAILED DESCRIPTION

Figure 1:
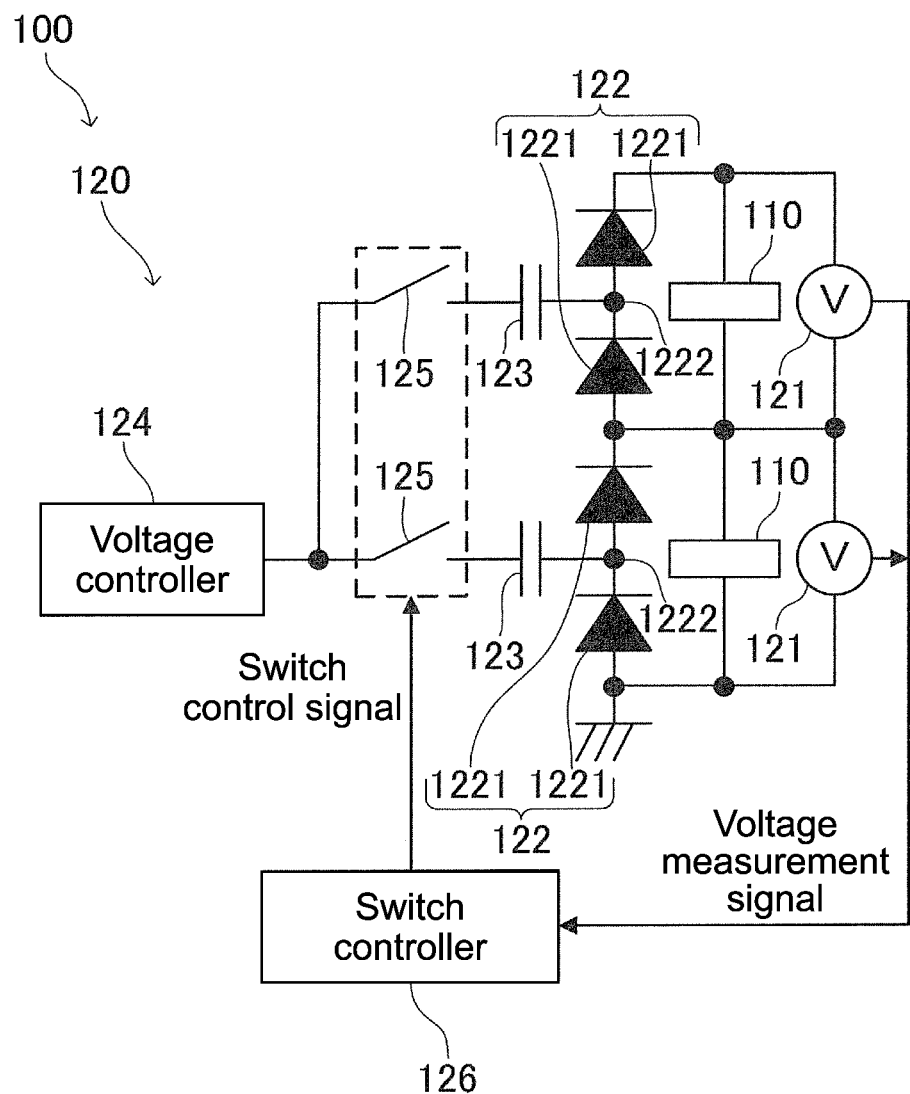
FIG. 1 is a circuit diagram showing an example of the structure of an electricity storage apparatus according to a first embodiment of the present disclosure.

Hereinafter, embodiments of the present disclosure will be described with reference to the drawings. The embodiments to be described below are examples of representative embodiments of the present disclosure, and the scope of the present disclosure is not narrowly interpreted by the embodiments. Further, in the embodiments, corresponding components are denoted by the same reference numerals, and an overlapping description will be omitted. The description will be given in the following order.
1. First embodiment
(Example of electricity storage apparatus provided with switch for connecting or disconnecting nodes between plurality of rectifier elements connected in parallel with electricity storage member to or from voltage controller)
2. First modified example of first embodiment
(Example of electricity storage apparatus in which electricity storage member is secondary battery)
3. Second embodiment
(Example of electricity storage apparatus in which voltage controller, to which external power supply is connected on input side, outputs rectangular wave amplitude of which is larger than maximum charge voltage of secondary battery)
4. Third embodiment
(Example of electricity storage apparatus in which secondary battery is connected to input side of voltage controller)
5. Fourth embodiment
(Example of electricity storage apparatus in which external power supply and secondary battery are selectively connected to input side of voltage controller)
6. Fifth embodiment
(Example of electricity storage system to which electricity storage apparatus according to present disclosure is applied)
<1. First Embodiment>
(Example of Structure of Apparatus)

FIG. 1 is a circuit diagram showing an example of the structure of an electricity storage apparatus 100 according to this embodiment. As shown in FIG. 1, the electricity storage apparatus 100 is provided with a plurality of electricity storage members 110 and a voltage equalization apparatus 120. The voltage equalization apparatus 120 is an embodiment of a voltage equalization apparatus according to the present disclosure.

(Electricity Storage Member 110)

As shown in FIG. 1, the electricity storage members 110 are connected in series. The electricity storage members 110 can be charged and discharged with electricity. That is, when charged, the electricity storage members 110 can store energy supplied from a power supply (not shown), and when discharged, the electricity storage members 110 can supply the energy stored therein to a load (not shown).

The number of electricity storage members 110 is not limited to two as shown in FIG. 1 and only has to be two or more. The number of electricity storage members 110 may be an even number or an odd number. The electricity storage members 110 may be structured with the same standard or different standards. In the present disclosure, a mode can be adopted in which another electricity storage member is connected in parallel with the series-connected electricity storage members. The kind of the electricity storage members 110 is not also limited, and for example, a secondary battery, a hybrid capacitor, or the like may be used.

(Voltage Equalization Apparatus 120)

As shown in FIG. 1, the voltage equalization apparatus 120 is provided with voltage measurement circuits 121, rectifier element groups 122, capacitors 123, a voltage controller 124, switches 125, and a switch controller 126.

(Voltage Measurement Circuit 121)

As shown in FIG. 1, the plurality of voltage measurement circuits 121 are provided so as to be corresponded to the electricity storage members 110. The voltage measurement circuits 121 are connected in parallel to the corresponding electricity storage members 110. The voltage measurement circuits 121 measure voltages of the corresponding electricity storage members 110, that is, terminal voltages. The voltage measurement circuits 121 each output the measurement result of the voltages of the electricity storage members 110 to the switch controller 126 as a voltage measurement signal. The voltage measurement signal may be output in such a manner that the electricity storage member 110 corresponding to the voltage measurement signal can be specified on the side of the switch controller 126. In this case, the voltage measurement signal may be output to an input terminal for each electricity storage member 110 provided to the switch controller 126 or may be associated with identification information of the electricity storage member 110, such as a number of each electricity storage member 110, but is not limited to those.

The specific form of the voltage measurement circuit 121 is not limited, and various circuits capable of measuring the voltages of the electricity storage members 110 can be used therefor. The voltage measurement circuit 121 may include an integrated circuit or the like. The voltage measurement circuit 121 may be formed of a voltage sensor, an analog front end, and the like but is not limited thereto.

(Rectifier Element Group 122)

As shown in FIG. 1, the plurality of rectifier element groups 122 are provided so as to be corresponded to the electricity storage members 110. In the structure shown in FIG. 1, the rectifier element group 122 is provided for each electricity storage member 110, that is, two groups are provided in total. The rectifier element groups 122 are connected in parallel with the corresponding electricity storage members 110. The rectifier element groups 122 are each constituted of a plurality of rectifier elements 1221 connected in series. The rectifier element groups 122 are connected with each other in series.

In the structure shown in FIG. 1, the same orientation of all the rectifier elements 1221, that is, the same rectification direction is set. In other words, a cathode of any rectifier element 1221 is connected to an anode of another rectifier element 1221 adjacent to the rectifier element 1221 concerned on the cathode side. The number of rectifier elements 1221 included in one rectifier element group 122 is not limited to two as shown in FIG. 1 but only has to be two or more. Between the rectifier element groups 122, the numbers of rectifier elements 1221 may be the same or different. The rectifier elements 1221 may be structured with the same standard or different standards. The kind of rectifier elements 1221 is not also limited, and may be, for example, a diode or the like.

(Capacitor 123)

The plurality of capacitors 123 are provided so as to be corresponded to the electricity storage members 110. In the structure shown in FIG. 1, the two capacitors 123 are provided, which is the same counts as the electricity storage members 110. The capacitors 123 are connected to nodes 1222 between the adjacent rectifier elements 1221 in the corresponding rectifier element group 122 through output terminals of the capacitors 123.

(Voltage Controller 124)

The voltage controller 124 is disposed on the input side of the capacitors 123. The voltage controller 124 is electrically connected with the capacitors 123. The voltage controller 124 controls voltages supplied to the electricity storage members 110. In other words, the voltage controller 124 controls voltages supplied to the capacitor 123. The control of the voltages may include control of waveforms of the voltages. The waveform of the voltage may be a rectangular wave, a sine wave, or the like but is not limited to those.

The specific form of the voltage controller 124 is not limited, and various electronic apparatuses capable of controlling the voltages may be used. In this case, the electronic apparatus may include an electronic elements such as a switching element and a resistor.

(Switch 125)

A plurality of switches 125 are disposed so as to be corresponded to the electricity storage members 110, respectively. In the structure shown in FIG. 1, two switches 125 are disposed in total for each of the electricity storage members 110. The switches 125 are connected to the capacitors 123, respectively. The switches 125 each connect and disconnect the nodes 1222 to and from the voltage controller 124. Specifically, the switch 125 is brought into the on state, that is, connected state, thereby connecting the corresponding node 1222 to the voltage controller 124, and brought into the off state, that is, disconnected state, thereby disconnecting the corresponding node 1222 from the voltage controller 124.

More specifically, the switch 125 is disposed between the corresponding capacitor 123 and the voltage controller 124. In other words, an output terminal of the switch 125 is connected to an input terminal of the corresponding capacitor 123, and an input terminal of the switch 125 is connected to the voltage controller 124. The input terminals of the switches 125 may be a common node. In the present disclosure, the mode in which the switch 125 is disposed between the capacitor 123 and the node 1222 may be adopted.

The specific mode of the switch 125 is not limited. For example, the switch 125 may be formed of a semiconductor element or the like. The semiconductor element may be a transistor or the like. The transistor may be a field effect transistor or the like. The field effect transistor may be a MOSFET (metal-oxide-semiconductor field effect transistor) or the like. By using the field effect transistor, it is possible to suppress power consumption.

(Switch Controller 126)

The switch controller 126 controls the operation state of the switches 125 on the basis of a measurement result of the voltage measurement circuit 121. As shown in FIG. 1, the switch controller 126 controls the switch 125 to be the on state or the off state on the basis of an output of a switch control signal with respect to the switch 125.

The specific mode of the switch controller 126 is not limited. For example, the switch controller 126 may be formed of an electronic apparatus or the like. In this case, the electronic apparatus may be provided with a processor such as a CPU (Central Processing Unit) and an MPU (Micro-Processing Unit), a storage apparatus such as a RAM (Random Access Memory) and a ROM (Read Only Memory), or the like. In the ROM, a program or data for achieving the function of the voltage equalization apparatus 120 may be stored. The processor may achieve the function of the voltage equalization apparatus 120 by executing the program stored in the ROM. The RAM may be used as a work area or the like for the processor. The switch controller 126 may be provided with a communication device for performing communication with an external device. In this case, the communication may be performed with a control apparatus (not shown) that performs overall management for the operation of a plurality of electricity storage apparatuses 100 but is not limited to this. In the communication, an instruction or the like of a voltage equalization operation may be input to the switch controller 126 but is not limited to this. The structure of the switch controller 126 is not limited to the above structure.

(Operation Example of Apparatus)

Figure 2:
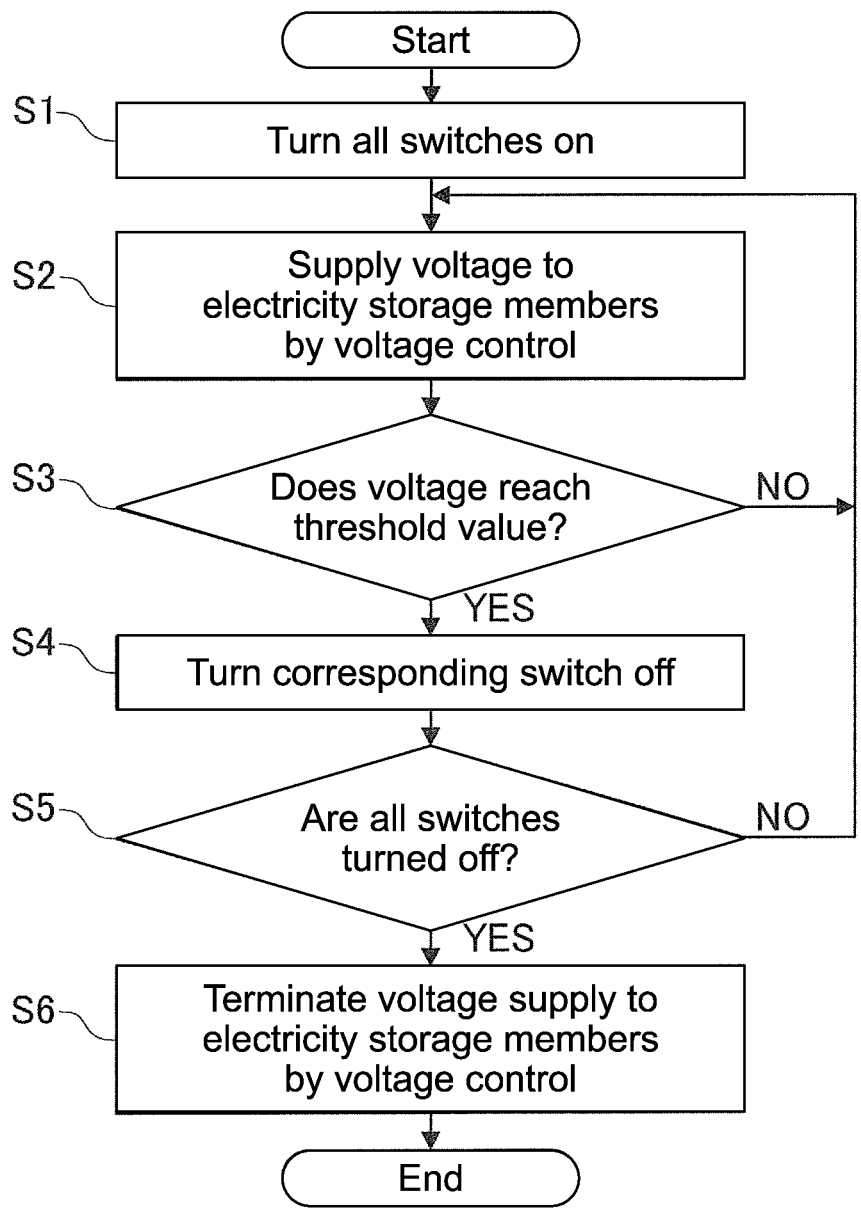
FIG. 2 is a flowchart showing an example of an operation of the electricity storage apparatus according to the first embodiment of the present disclosure.

FIG. 2 is a flowchart showing an example of an operation of the electricity storage apparatus 100 according to this embodiment.

For convenience of explanation, in an initial state in FIG. 2, all the switches 125 are set to be off state, that is, all the nodes 1222 are disconnected from the voltage controller 124, and the voltage equalization operation is not started. A trigger of the start of the voltage equalization operation is not limited, and for example, a periodic timing or the like may be set. An occurrence of the trigger of the start of the voltage equalization operation may be detected by the switch controller 126 but is not limited to this.

From the initial state, when the voltage equalization operation is started, first, in Step 1 (S1) of FIG. 2, by the switch controller 126, all the switches 125 are turned on.

Then, in Step 2 (S2), by performing the voltage control by the voltage controller 124, through the capacitors 123 and the rectifier element groups 122, the voltage is supplied to the electricity storage members 110.

Then, in Step 3 (S3), on the basis of the measurement result of the voltage measurement circuits 121, the switch controller 126 determines whether the voltage of the electricity storage member 110 reaches a threshold value or not for each of the electricity storage members 110. The specific mode of the threshold value is not limited, and various values with which the voltage equalization with respect to the electricity storage member 110 as a target is determined to be completed may be set therefor. Then, for the electricity storage member 110 for which a positive determination result is obtained, the process proceeds to Step 4 (S4), and for the electricity storage member 110 for which a negative determination result is obtained, Step 2 (S2) is repeatedly performed.

Then, in Step 4 (S4), by the switch controller 126, the switch 125 corresponding to the electricity storage member 110 for which the positive determination result is obtained in Step 3 (S3), that is, the corresponding switch 125 is turned off.

Then, in Step 5 (S5), the switch controller 126 determines whether all the switches 125 are turned off or not. In the case where the positive determination result is obtained, the process proceeds to Step 6 (Step 6), and in the case where the negative determination result, the process returns to Step 2 (S2).

Then, in Step 6 (S6), the voltage supply by the voltage control by the voltage controller 124 is terminated, and the voltage equalization operation is terminated.

By the electricity storage apparatus 100 according to this embodiment, it is possible to individually stop the voltage supply to the electricity storage member 110, the voltage of which reaches the threshold value, by releasing the switch 125. As a result, irrespective of variations of the characteristics of the circuit elements such as the capacitor 123 and the rectifier element 1221, it is possible to appropriately perform the voltage equalization for the electricity storage member 110.

Here, a last charge stop voltage in the equalization circuit described in Japanese Patent Application Laid-open No. 2013-183557 includes the threshold voltage of two series diodes connected in parallel with an electricity storage cell. Therefore, in the equalization circuit, if the threshold voltage of the diode varies, the charge stop voltage of each electricity storage cell also varies. Because the threshold voltage of the diode differs depending on an individual difference, an environment temperature, a degree of an energized current, or the like, it is difficult to suppress the variation of the charge stop voltage, and a certain electricity storage cell may be overcharged as compared to another electricity storage cell. If the voltage supply to all the electricity storage cells in order to avoid this, charging to the electricity storage cell that may not be overcharged is also stopped, so it is difficult to suppress the variation of the charging. In contrast, in the present disclosure, it is possible to individually control the voltage supply to the electricity storage members 110 as described above. As a result, it is possible to achieve the appropriate voltage equalization in which the charging variation is effectively suppressed.

By the electricity storage apparatus 100 according to the present disclosure, it is possible to cut waste of energy as compared to the case where a charged current corresponding to the cell fully charged is caused to flow not to the cell but to a bypass circuit and is consumed at a resistor in the circuit. Alternatively, by the electricity storage apparatus 100 according to the present disclosure, it is possible to cut cost down and reduce in size and weight as compared to the case where the voltage equalization is performed by using a transformer. Alternatively, by the electricity storage apparatus 100 according to the present disclosure, the number of the electricity storage members is not limited and may be odd number or even number, so it is possible to secure the degree of freedom of design.

<2. First Modified Example of First Embodiment>

Figure 3:
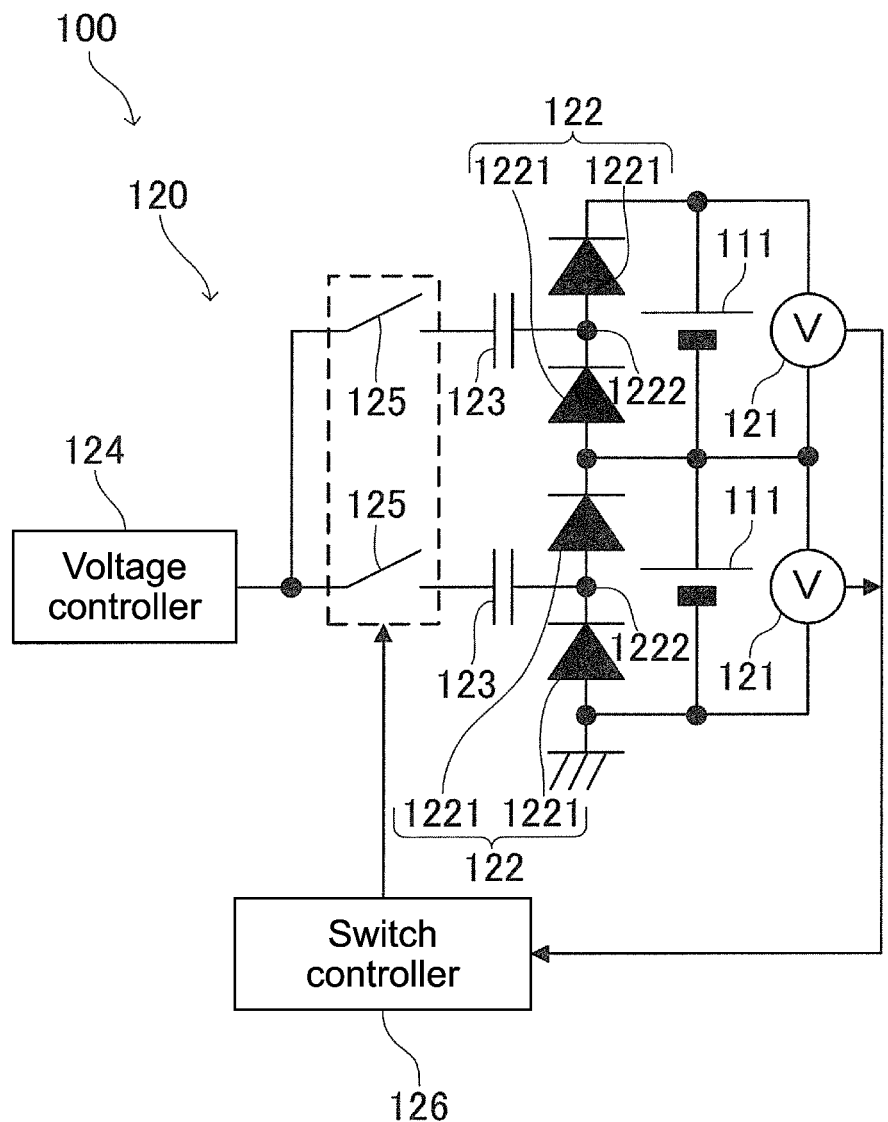
FIG. 3 is a circuit diagram showing an example of the structure of an electricity storage apparatus according to a first modified example of the present disclosure.

The electricity storage apparatus 100 of this modified example is obtained by further specifying the mode of the electricity storage member 110 with respect to the electricity storage apparatus 100 shown in FIG. 1. Specifically, as shown in FIG. 3, the electricity storage apparatus 100 of this modified example includes a secondary battery 111 as an example of the electricity storage member 110.

The secondary battery 111 may be a lithium ion secondary battery, a lead storage battery, or the like. The specific mode of the lithium ion secondary battery is not limited. As an example of a desirable mode, a lithium ion secondary battery which uses olivine-type iron phosphate having advantages such as a long life, high safety performance, quick charge performance, and the like may be adopted. For example, a cathode electrode of the secondary battery comprises olivine-type iron phosphate.

Figure 4:
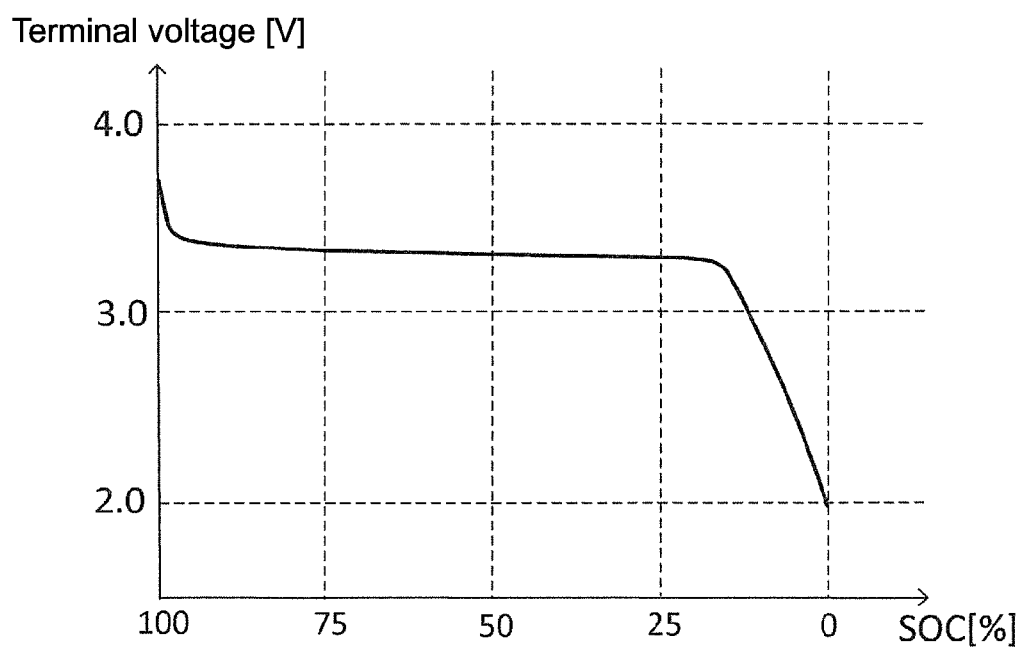
FIG. 4 is a graph showing an example of a discharge curve of a lithium ion secondary battery using olivine-type iron phosphate.

Here, an example of a discharge curve of the lithium ion secondary battery that uses the olivine-type iron phosphate is shown in FIG. 4. As the discharge characteristic shown in FIG. 4, immediately after the discharge is started, a large voltage drop due to an internal resistance occurs, but after that, a flat state continues. Therefore, a variation of the voltage in an assembled battery formed by series connection is small. Further, in the case where the lithium ion secondary battery of this type is applied to an electricity storage power supply in a smart grid, a temperature distribution of the batteries is relatively uniform, and a load current shows a small variation as compared to the case of an automobile or the like. Therefore, a variation of the voltage between the batteries is further reduced. Thus, in the case where the lithium ion secondary battery that uses the olivine-type iron phosphate is applied, it is less necessary to quickly eliminate the variation of the voltage between the cells by using a large amount of current, and it is possible to keep a balance of the voltage between the cells with a small current with no waste.

By the electricity storage apparatus 100 of this modified example, it is possible to perform the appropriate voltage equalization for the secondary battery 111 with less influence of the variation of characteristics of the circuit elements or perform the efficient voltage equalization with a small current.

<3. Second Embodiment>

(Example of Structure of Apparatus)

Figure 5:
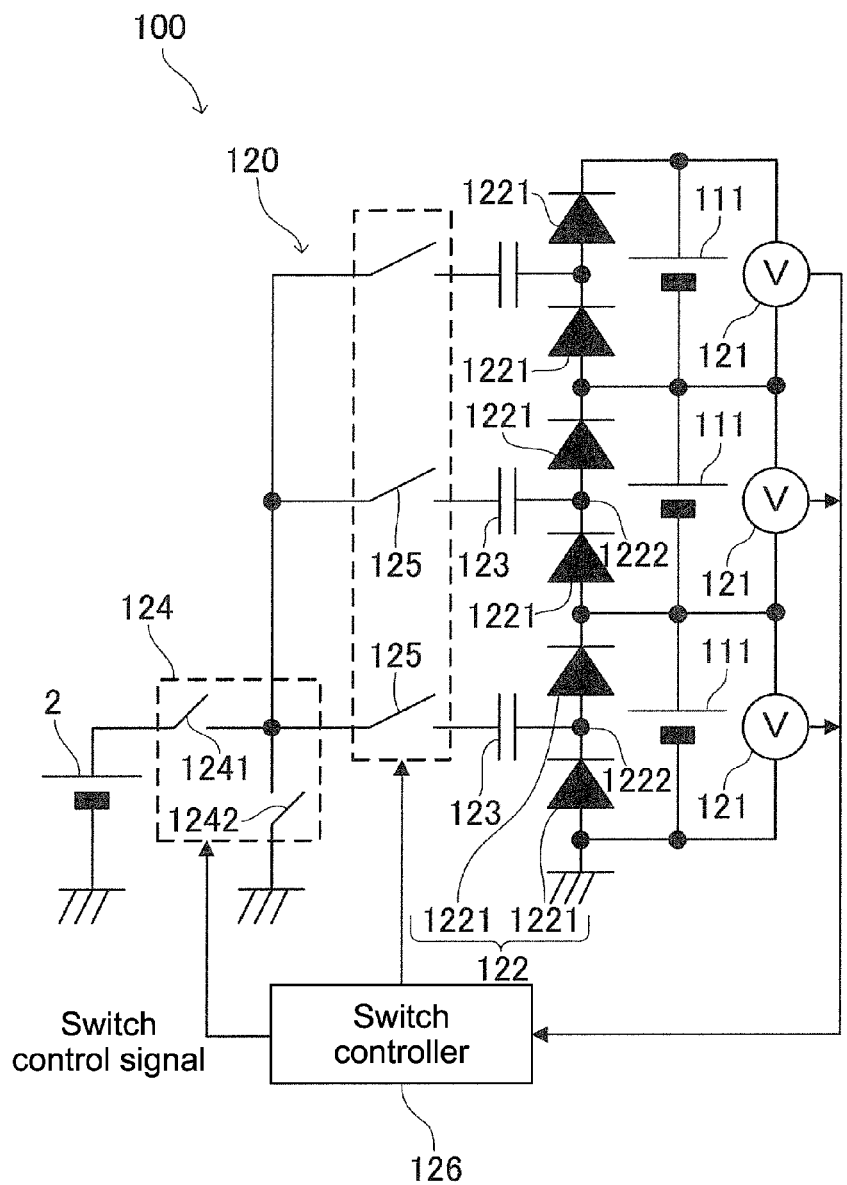
FIG. 5 is a circuit diagram showing an example of the structure of an electricity storage apparatus according to a second embodiment of the present disclosure.

FIG. 5 is a circuit diagram showing an example of the structure of the electricity storage apparatus 100 according to this embodiment. The electricity storage apparatus 100 according to this embodiment is formed by further specifying the structure of the voltage controller 124 with respect to the electricity storage apparatus 100 shown in FIG. 3.

Specifically, as shown in FIG. 5, in the electricity storage apparatus 100 according to this embodiment, to an input side of the voltage controller 124, an external power supply 2 is connected. Further, as shown in FIG. 5, the voltage controller 124 is provided with a first switch 1241 connected to the external power supply 2 and a second switch 1242 connected to the ground. The first switch 1241 and the second switch 1242 are connected in parallel with each other.

Figure 6:
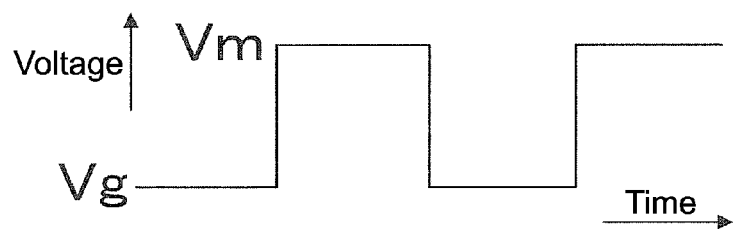
FIG. 6 is a time chart of a rectangular wave voltage showing an example of the structure of the electricity storage apparatus according to the second embodiment of the present disclosure.

The voltage controller 124 outputs such rectangular waves as shown in FIG. 6 that a maximum voltage is set as a voltage Vm (V) of the external power supply 2, and a minimum voltage is set as a ground voltage Vg (V) by alternately and selectively turning the first switch 1241 or the second switch 1242 on. The switch controller 126 controls the operation states of the switches 1241 and 1242 on the basis of the output of a switch control signal with respect to the first switch 1241 and the second switch 1242.

(Operation Principle)

Figure 7:
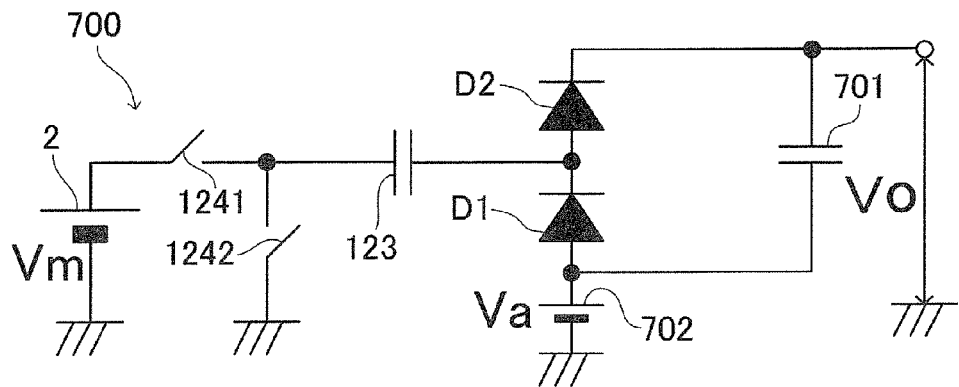
FIG. 7 is a first circuit diagram for explaining an operation principle of the electricity storage apparatus according to the second embodiment of the present disclosure.

Here, an operation principle of the electricity storage apparatus 100 according to this embodiment will be described with reference to a circuit 700 shown in FIG. 7, a circuit 1000 shown in FIG. 10, and a circuit 1100 shown in FIG. 11. The circuit 700 shown in FIG. 7 is different from the electricity storage apparatus 100 shown in FIG. 5 in that only one group of 2 series diodes D1 and D2 is provided as a rectifier element group. Further, the circuit 700 shown in FIG. 7 is different from the electricity storage apparatus 100 shown in FIG. 5 in that a capacitor 701 is provided instead of the secondary battery 111. Further, the circuit 700 shown in FIG. 7 is different from the electricity storage apparatus 100 shown in FIG. 5 in that an electricity storage element 702 is disposed between the anode of the diode D1 and the ground. In addition, the circuit 700 shown in FIG. 7 is different from the electricity storage apparatus 100 shown in FIG. 5 in that the switch 125 is not provided or is in the on state at all times.

In the circuit 700 in the state shown in FIG. 7, the first switch 1241 and the second switch 1242 are turned off. Further, in the state shown in FIG. 7, a charge, that is, an initial charge stored in the capacitor 701 is set to 0 (C). In addition, a voltage of the electricity storage element 702 is set to Va (V). In addition, threshold voltages of the diodes D1 and D2 each are set to Vt (V).

Figure 8:
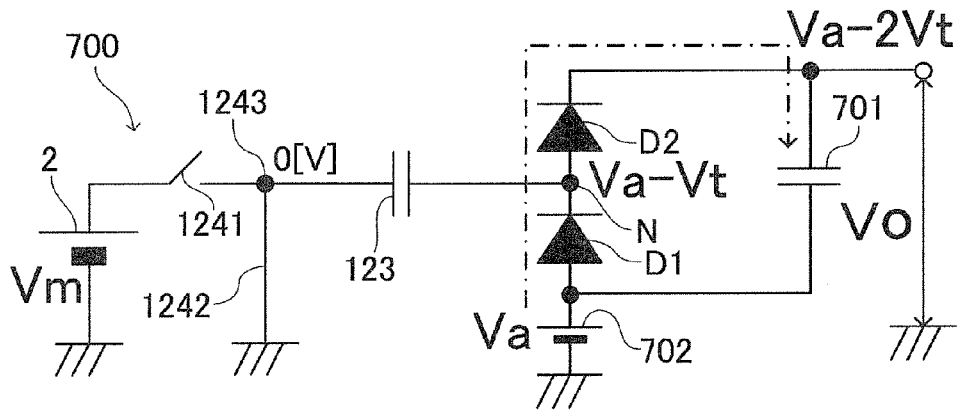
FIG. 8 is a second circuit diagram for explaining an operation principle of the electricity storage apparatus according to the second embodiment of the present disclosure.

Subsequently, as shown in FIG. 8, when the second switch 1242 is turned on from the state shown in FIG. 7, from the electricity storage element 702, a current (see, the arrow of dashed-dotted line of FIG. 8) is caused to flow, an voltage of a node N between the diodes D1 and D2 becomes Va−Vt (V). In addition, a voltage of a node 1243 that connects a power line on the first switch 1241 side and a power line on the second switch 1242 side becomes equal to a ground potential (here, 0 (V)). Further, an output voltage Vo of the circuit 700 is reduced from the voltage of the node N by the threshold voltage of one diode D2 and thus becomes Va−2Vt (V).

Figure 9:
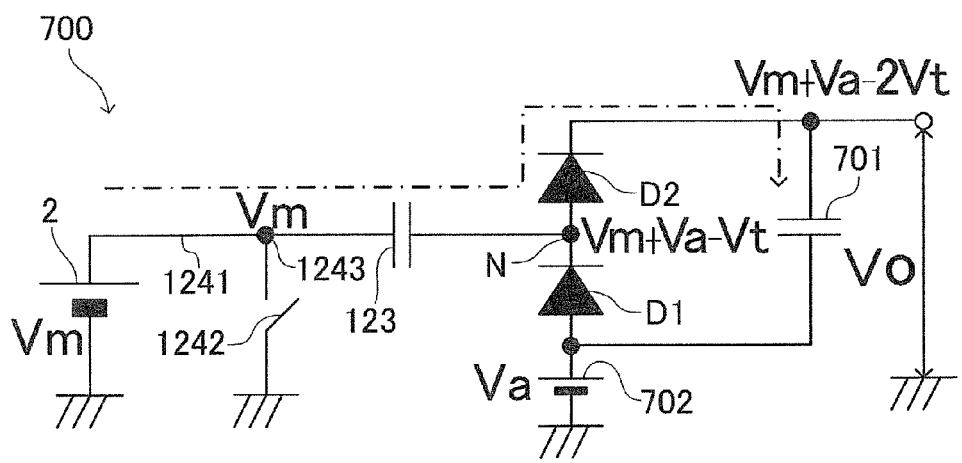
FIG. 9 is a third circuit diagram for explaining an operation principle of the electricity storage apparatus according to the second embodiment of the present disclosure.

Then, as shown in FIG. 9, the first switch 1241 is switched to the on state, and the second switch 1242 is switched to the off state. As a result, the voltages at the both ends of the capacitor 123 are kept, so the voltage of the node 1243 is Vm (V). In addition, the voltage of the node N between the diodes D1 and D2 is Vm+Va−Vt (V). Further, the output voltage Vo is Vm+Va−2Vt (V). As a result, a potential different between the both ends of the capacitor 701, that is, the load becomes Vm−2Vt (V). In this way, in the circuit 700 in which the load is the capacitor 701, by switching the operation states of the switches 1241 and 1242 one time for each, the output voltage can be boosted up from Va (V) to Vm−2Vt (V).

Figure 10:
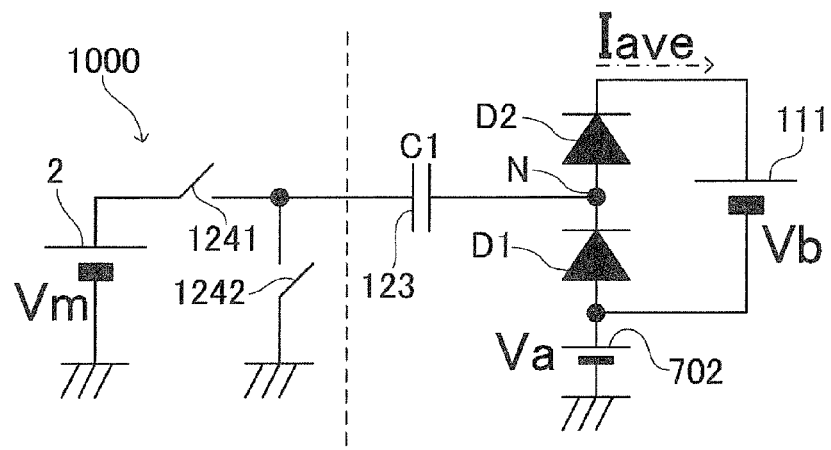
FIG. 10 is a fourth circuit diagram for explaining an operation principle of the electricity storage apparatus according to the second embodiment of the present disclosure.

Next, the circuit 1000 obtained by changing the load in the circuit 700 described above from the capacitor 701 to the secondary battery 111 is shown in FIG. 10. Here, in the circuit 1000 shown in FIG. 10, a switching frequency at a time when the first switch 1241 and the second switch 1242 are alternately turned on and off is set to f (Hz). Further, a capacitance of the capacitor 123 is set to C1 (F). In addition, a voltage of the secondary battery 111 is set to Vb (V).

Here, in assuming that Vm−2Vt (V) is higher than the voltage Vb (V) of the secondary battery 111, as shown in FIG. 10, in the secondary battery 111, an average current Iave (A) flows. The average current Iave flows until the voltage Vb becomes Vm−2Vt. The average current Iave can be expressed by the following expression 1.

$$Iave = C1 \cdot f \cdot (Vm - 2Vt - Vb) \qquad \text{Expression 1:}$$

According to this expression, it is found that the average current Iave can be adjusted with the switching frequency f.

Figure 11:
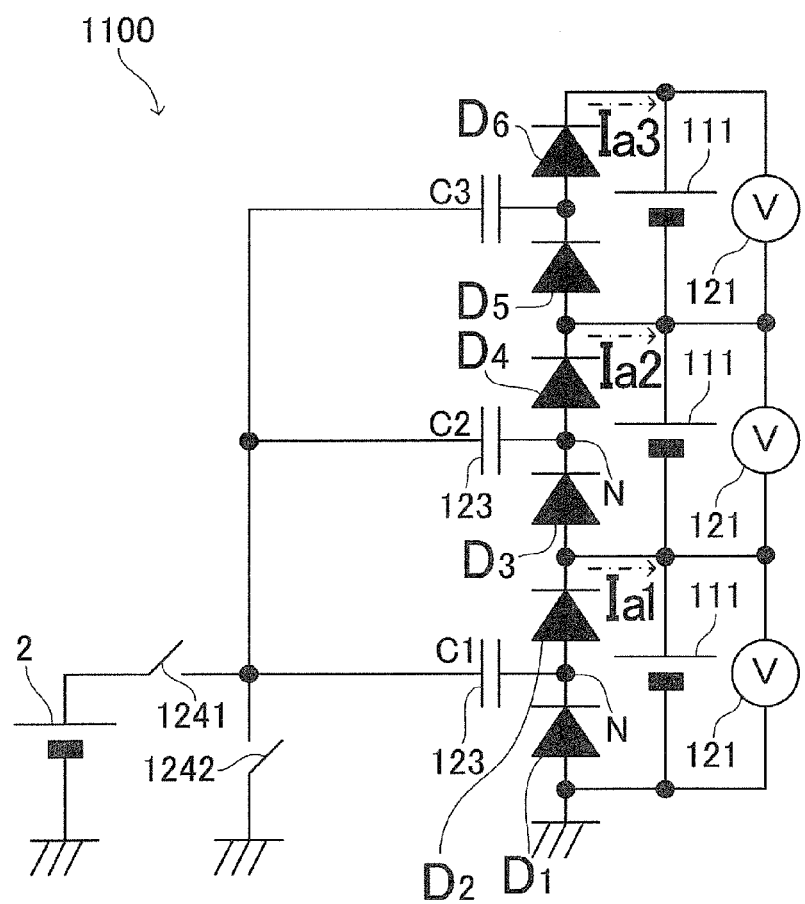
FIG. 11 is a fifth circuit diagram for explaining an operation principle of the electricity storage apparatus according to the second embodiment of the present disclosure.

Subsequently, FIG. 11 shows the circuit 1100 formed by stacking multiple circuit elements shown on the right side from the broken line of the circuit 1000 shown in FIG. 10. In the circuit 1100 shown in FIG. 11, the voltage Va indicated on the ground side of the group of the diodes in the circuit 1000 shown in FIG. 10 is omitted, because the voltage is a total value of the threshold voltages of the group of the diodes on a lower side (ground side) for the group of the diodes. In the circuit 1100 shown in FIG. 11, the secondary batteries 111 connected in series can be individually charged by the one power supply 2. Here, as shown in FIG. 11, threshold voltages of six diodes D1 to D6 that are connected to the three series-connected secondary batteries 111 by two for each battery are set as Vt1 to Vt6. In addition, capacitances of the three capacitors 123 in total which are connected to the nodes N between the diodes are set to C1 to C3 (F). In this case, finally reached voltages VL1 to VL3 of the secondary batteries 111 are expressed by Expression 2 as follows.

$$VL1 = Vm - Vt1 - Vt2$$

$$VL2 = Vm - Vt3 - Vt4$$

$$VL3 = Vm - Vt5 - Vt6 \qquad \text{Expression 2:}$$

Further, in assuming that the voltages of the secondary batteries 111 are set to Vb1 to Vb3, average currents Ia1 to Ia3 that flow in the secondary batteries 111 are expressed by Expression 3 as follows.

$$Ia1 = C1 \cdot f \cdot (Vm - Vt1 - Vt2 - Vb1)$$

$$Ia2 = C2 \cdot f \cdot (Vm - Vt3 - Vt4 - Vb2)$$

$$Ia3 = C3 \cdot f \cdot (Vm - Vt5 - Vt6 - Vb3) \qquad \text{Expression 3:}$$

As can be seen from Expression 2, in the circuit 1100 shown in FIG. 11, the finally reached voltage VL1 to VL3 vary, because the threshold voltages Vt1 to Vt6 of the diodes vary. In a general Schottky diode, the variation of the threshold voltages Vt is approximately 30 (mV) at a time when the same current is caused to flow, so the voltages Vb1 to Vb3 of the secondary batteries 111 are also caused to vary by approximately 30 (mV). Here, in the case where the lithium ion secondary battery or the like is used as the electricity storage member, it may be necessary to perform the measurement and control of the voltage on the order of 1 to 5 (mV) in a viewpoint of safety. For this reason, it is difficult to permit the variation of the finally reached voltage of 30 (mV). Further, as can be seen from Expression 3, the charged current of the secondary batteries 111 is affected not only by the variation of the diode threshold voltages Vt1 to Vt6 but also by the variation of the capacitances C1 to C3 of the capacitors. In this way, in the circuit 1100 shown in FIG. 11, due to the variations of the characteristics of the circuit elements, the finally reached voltages of the electricity storage members differ from each other.

In contrast, in the electricity storage apparatus 100 according to this embodiment, as shown in FIG. 5, the switches 125 are provided between the voltage controller 124 and the capacitors 123. Further, in the electricity storage apparatus 100 according to this embodiment, the external power supply 2 is set so as to establish Expression 4 as follows.

$$Vm \geq Vcmax + Vt1max + Vt2max$$

$$Vm \geq Vcmax + Vt3max + Vt4max$$

$$Vm \geq Vcmax + Vt5max + Vt6max \qquad \text{Expression 4:}$$

where Vcmax represents a full charge voltage of the secondary battery 111 and Vt1max to Vt6max represent maximum values of Vt1 to Vt6, respectively.

In accordance with the setting of the external power supply 2, the rectangular wave output from the voltage controller 124 as described above, that is, the rectangular wave of the maximum voltage Vm and the minimum voltage Vg has an amplitude that is larger than the maximum charge voltage of the secondary battery 111, that is, the full charge voltage Vcmax. In other words, the voltage controller 124 in this embodiment outputs the rectangular wave, the amplitude of which is larger than the maximum charge voltage of the secondary battery 111, in combination with the external power supply 2. The external power supply 2 may be a variable voltage power supply that the setting of the voltage Vm can be changed.

Expression 4 can be generalized as expressed in Expression 5 as follows. Therefore, applications can be achieved in addition to the form of FIG. 5.

$$Vm \geq Vcmax + 2 \times MAX(Vtimax)$$

$$i = 1 \sim N \quad \text{Expression 5:}$$

In Expression 5, N represents a series connection count of the diodes, that is, the rectifier elements and MAX(Vtimax) represents a maximum value of Vtimax.

Further, by substituting Expression 5 (in the case of equality) into Expression 2, Expression 6 is established as follows.

$$VL1 = Vcmax + 2 \times MAX(Vtimax)_{i=1 \sim 6} - Vt1 - Vt2 \geq Vcmax$$

$$VL2 = Vcmax + 2 \times MAX(Vtimax)_{i=1 \sim 6} - Vt3 - Vt4 \geq Vcmax$$

$$VL2 = Vcmax + 2 \times MAX(Vtimax)_{i=1 \sim 6} - Vt5 - Vt6 \geq Vcmax \quad \text{Expression 6:}$$

Expression 6 shows that the finally reached voltages VL1 to VL3 of the secondary batteries 111 in the electricity storage apparatus 100 according to this embodiment reach the full charge voltage irrespective of the variation of the threshold voltages Vt.

Further, the switch controller 126 according to this embodiment sets the switches 125 to be on at the start of the voltage equalization operation, and then switches the switch 125 corresponding to the secondary battery 111 the voltage of which reaches the full charge voltage to be off. For the secondary battery 111 corresponding to the switch 125 that is in the off state, a current path from the external power supply 2 is disconnected. Therefore, the charging is stopped before being overcharged.

(Example of Operation of Apparatus)

Figure 12:
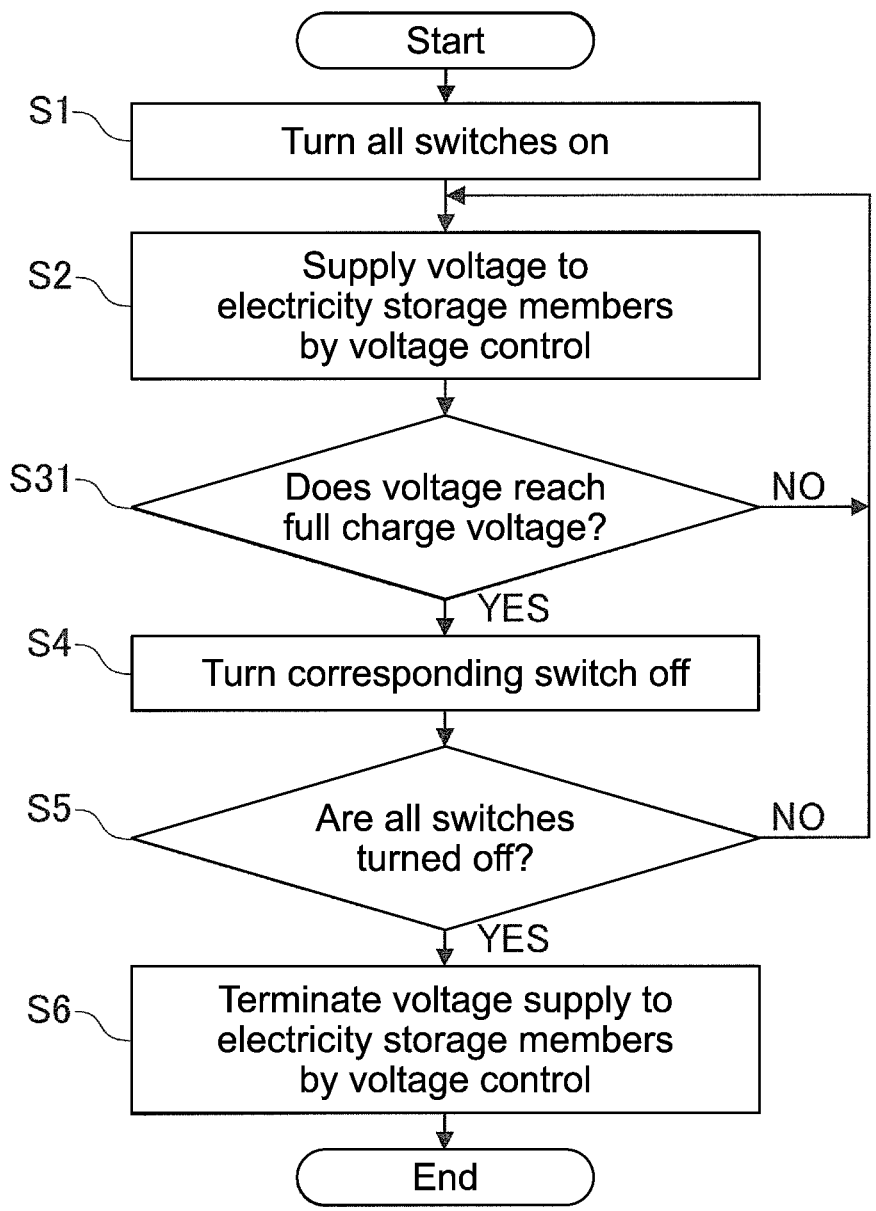
FIG. 12 is a flowchart showing an example of an operation of the electricity storage apparatus according to the second embodiment of the present disclosure.

FIG. 12 is a flowchart showing an example of an operation of the electricity storage apparatus 100 according to this embodiment.

In FIG. 12, as a specific example of Step 3 of FIG. 2, Step 31 (S31) is performed.

In Step 31 (S31), on the basis of the measurement result of the voltage measurement circuit 121, the switch controller 126 determines whether the voltage of the secondary battery 111 reaches the full charge voltage or not for each of the secondary batteries 111. Then, for the secondary battery 111 for which a positive determination result is obtained, the process proceeds to Step 4 (S4), for the secondary battery 111 for which a negative determination result is obtained, Step 2 (S2) is repeatedly performed.

By the electricity storage apparatus 100 according to this embodiment, it is possible to exert the same effect as the electricity storage apparatus 100 shown in FIG. 3 or appropriately perform the voltage equalization that uses the external power supply. Alternatively, by the electricity storage apparatus 100 according to this embodiment, by outputting the rectangular wave larger than the maximum charge voltage of the secondary battery 111 by the voltage controller 124, all the secondary battery 111 can be reliably caused to reach the full charge voltage by the simple method. Alternatively, by the electricity storage apparatus 100 according to this embodiment, the switch 125 corresponding to the secondary battery 111 that reaches the full charge voltage is controlled to be turned off by the switch controller 126, with the result that it is possible to keep the full charge state of the secondary batteries 111 constant without being affected by the variation of the elements.

<Third Embodiment>

Figure 13:
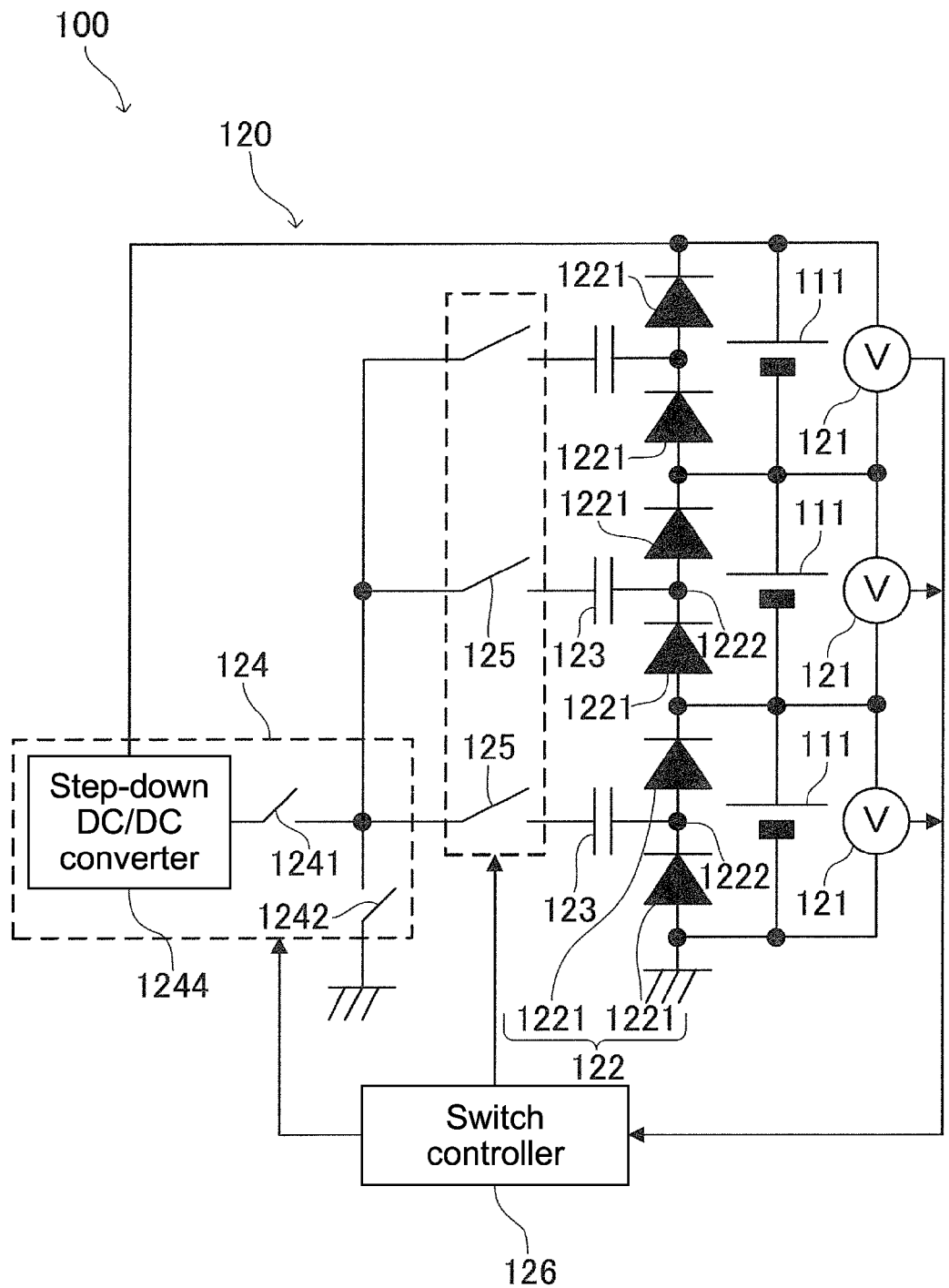
FIG. 13 is a circuit diagram showing an example of the structure of an electricity storage apparatus according to a third embodiment of the present disclosure.

FIG. 13 is a circuit diagram showing an example of the structure of the electricity storage apparatus 100 according to this embodiment. The electricity storage apparatus 100 according to this embodiment is different from the electricity storage apparatus 100 shown in FIG. 5 in terms of the structure of the voltage controller 124.

Specifically, as shown in FIG. 13, in the electricity storage apparatus 100 according to this embodiment, to an input side of the voltage controller 124, the secondary batteries 111 are connected. Further, as shown in FIG. 13, the voltage controller 124 includes a step-down DC-DC converter 1244 as an example of a DC-DC conversion circuit.

More specifically, to the step-down DC-DC converter 1244, voltages in series of all the secondary batteries 111 are input. The step-down DC-DC converter 1244 steps down the voltages in series that are input and inputs the voltages to the first switch 1241. That is, the electricity storage apparatus 100 according to this embodiment redistributes energy from all the secondary batteries 111 to the secondary batteries 111 through the voltage equalization operation. By the voltage equalization operation as described above, the secondary batteries 111 reaches to have an average voltage of all the secondary batteries 111 eventually.

The switch controller 126 controls the switches 125 to be on at the start of the voltage equalization operation, and then switches the switch 125 corresponding to the secondary battery 111 that reaches the average voltage to be off. It should be noted that the average voltage may be calculated by the switch controller 126 or may be calculated by a component other than the switch controller 126.

(Example of Operation of Apparatus)

Figure 14:
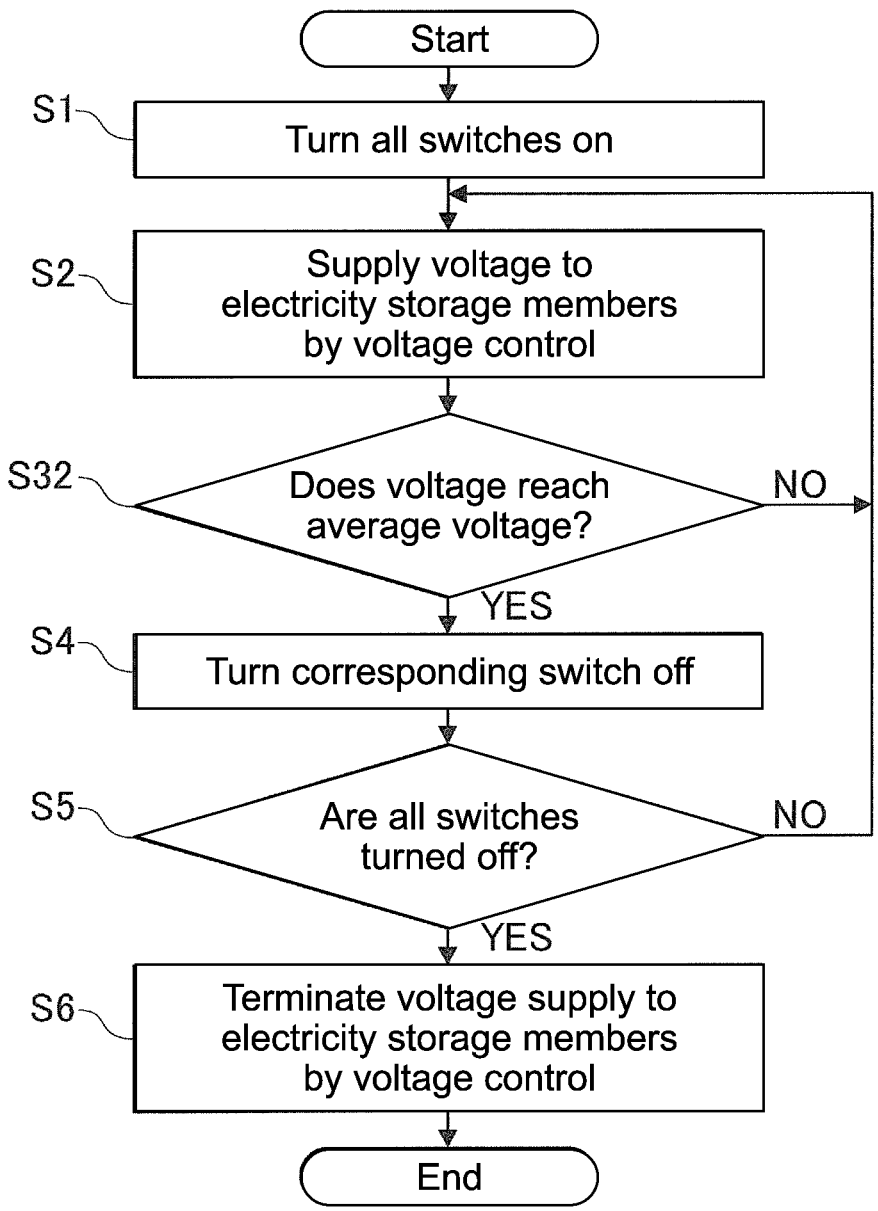
FIG. 14 is a flowchart showing an example of an operation of the electricity storage apparatus according to the third embodiment of the present disclosure.

FIG. 14 is a flowchart showing an example of an operation of the electricity storage apparatus 100 according to this embodiment.

In FIG. 14, as a specific example of Step 3 of FIG. 2, Step 32 (S32) is performed.

In Step 32 (S32), on the basis of a measurement result of the voltage measurement circuit 121, the switch controller 126 determines whether the voltage of the secondary batteries 111 reach the average voltage calculated in advance or not for each of the secondary batteries 111. Then, for the secondary battery 111 for which a positive determination result is obtained, the process proceeds to Step 4 (S4), and for the secondary battery 111 for which a negative determination result is obtained, Step 2 (S2) is repeatedly performed.

By the electricity storage apparatus 100 according to this embodiment, it is possible to exert the same effect as the electricity storage apparatus 100 shown in FIG. 3 or efficiently perform the voltage equalization by redistributing the voltages of all the secondary batteries 2. Further, by using the step-down DC-DC converter 1244, the voltages of all the all the secondary batteries 111 can be adjusted to be used for the voltage equalization. As a result, it is possible to appropriately perform the voltage equalization.

<Fourth Embodiment>

Figure 15:
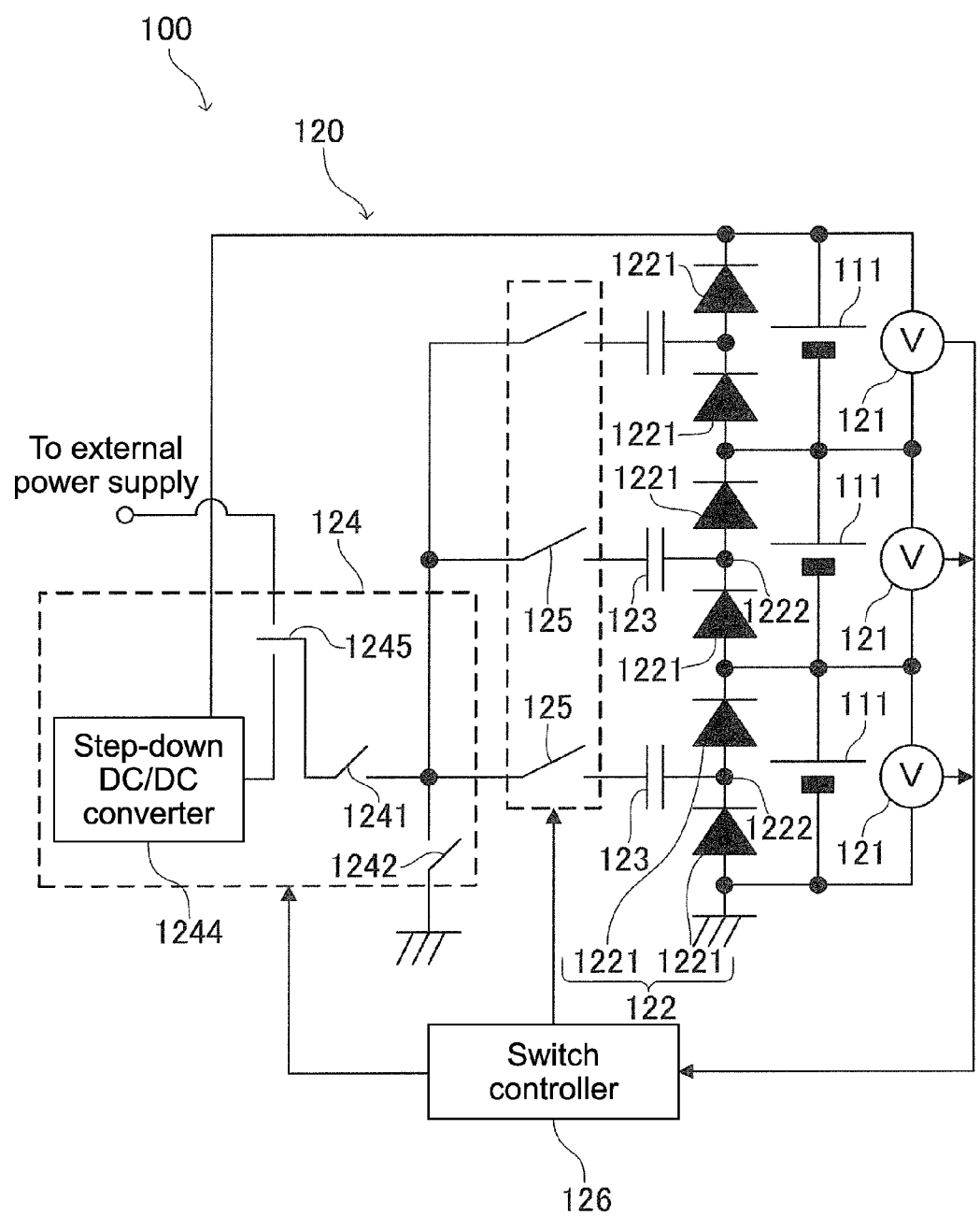
FIG. 15 is a circuit diagram showing an example of the structure of an electricity storage apparatus according to a fourth embodiment of the present disclosure.

FIG. 15 is a circuit diagram showing an example of the structure of the electricity storage apparatus 100 according to this embodiment. The electricity storage apparatus 100 according to this embodiment is different from the electricity storage apparatus 100 shown in FIG. 13 in terms of the structure of the voltage controller 124.

Specifically, as shown in FIG. 15, in the electricity storage apparatus 100 according to this embodiment, to the input side of the voltage controller 124, both of the external power supply 2 and the secondary battery 111 can be connected. Further, the voltage controller 124 includes a third switch 1245. The third switch 1245 selectively connects the external power supply 2 and the secondary battery 111 to the first switch 1241. That is, in the electricity storage apparatus 100 according to this embodiment, equalization charge by using the external power supply 2 and redistribution of energy of the secondary battery 111 can be switched.

An operation of the third switch 1245 may be controlled by an output of a switch control signal by the switch controller 126. The specific mode in which either the external power supply 2 or the secondary battery 111 is used is not limited. For example, in the case where the total voltage of the secondary batteries 111 exceeds the threshold value, the third switch 1245 is connected to the secondary batteries 111. In the case where the total voltage thereof is equal to or less than the threshold value, the third switch 1245 may be connected to the external power supply 2 but is not limited to this.

(Example of Operation of Apparatus)

Figure 16:
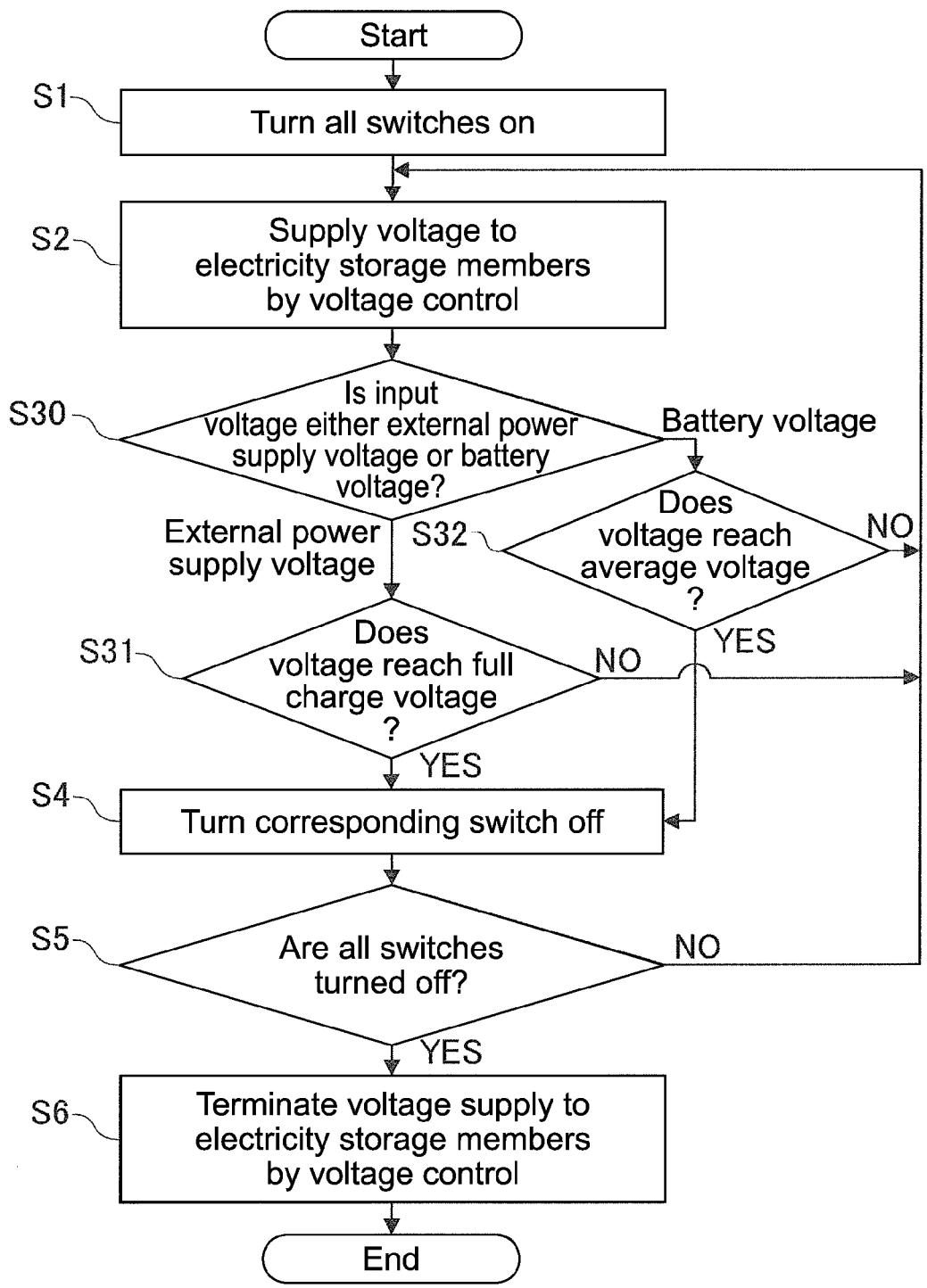
FIG. 16 is a flowchart showing an example of an operation of the electricity storage apparatus according to the fourth embodiment of the present disclosure.

FIG. 16 is a flowchart showing an example of an operation of the electricity storage apparatus 100 according to this embodiment.

In FIG. 16, as a specific example of Step 3 of FIG. 2, Step 30 (S30) to Step 32 (S32) are performed. The content of Step 31 (S31) is as described in FIG. 12. The content of Step 32 (S32) is as described in FIG. 14. In Step 30 (S30), in the case where the voltage of the external power supply 2 is input, the switch controller 126 then performs Step 31 (S31), and in the case where the voltages of the secondary batteries 11 are input, the switch controller 126 then performs Step 32 (S32).

By the electricity storage apparatus 100 according to this embodiment, it is possible to exert the same effect as the electricity storage apparatus 100 shown in FIG. 5 and FIG. 13 or perform the voltage equalization that selectively uses the secondary battery 111 and the external power supply 2. Therefore, it is possible to increase the convenience.

<Fifth Embodiment>

Figure 17:
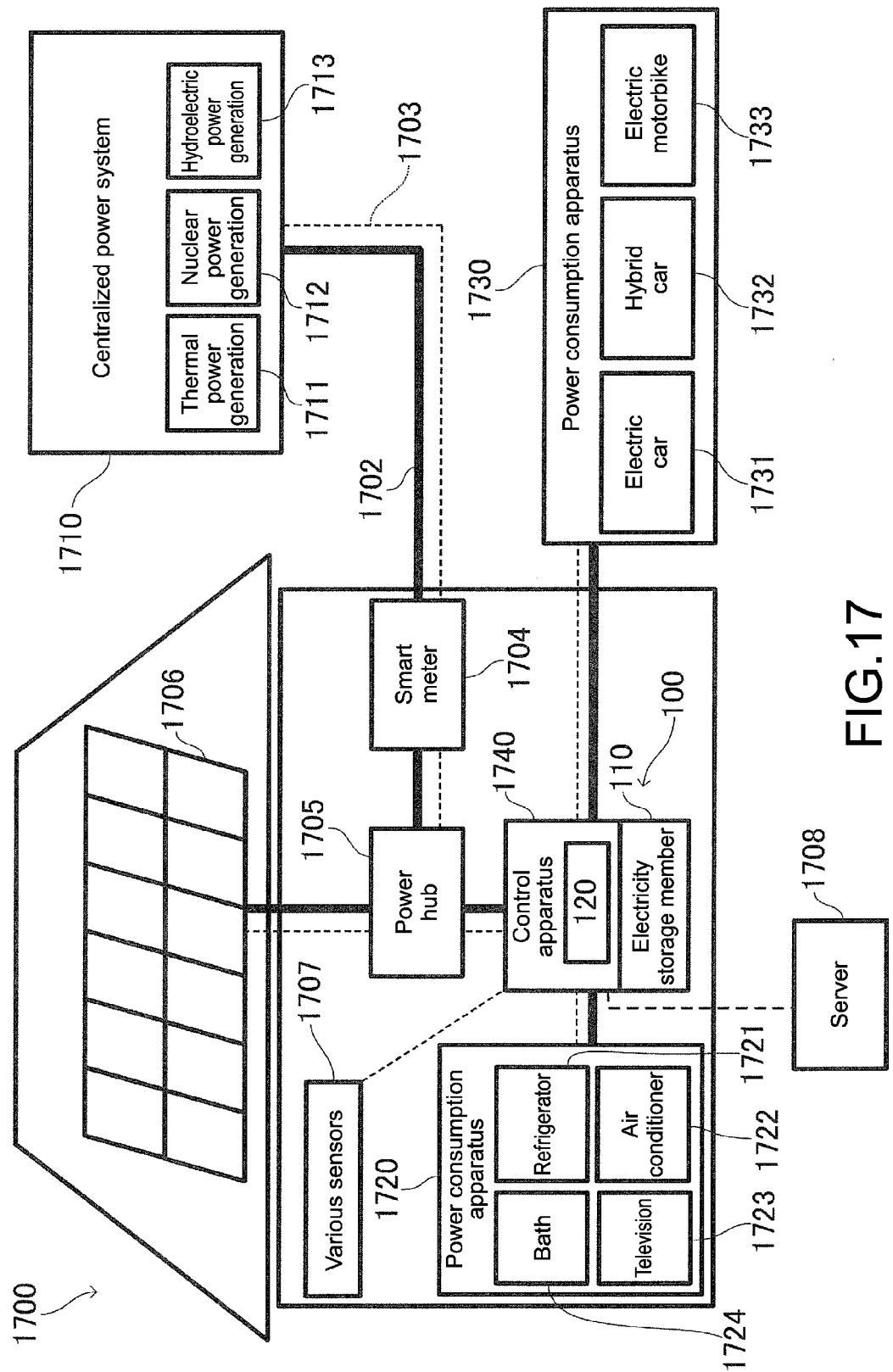
FIG. 17 is a block diagram showing an application example of the electricity storage apparatus according to the present disclosure to an electricity storage system.

FIG. 17 is a diagram showing an electricity storage system 1700 to which the electricity storage apparatus 100 according to the present disclosure is applied. The electricity storage system 1700 is applied to a house, a building, or the like.

As FIG. 17, in the electricity storage system 1700, from a centralized power system 1710 including a thermal power generation 1711, a nuclear power generation 1712, a hydroelectric power generation 1713, and the like, electric power is supplied to the electricity storage member 110 through a power network 1702, an information network 1703, a smart meter 1704, a power hub 1705, and the like. As a result, the electricity storage member 110 is charged. It should be noted that, in FIG. 17, for convenience, only one electricity storage member 110 is representatively shown. But in actuality, the plurality of electricity storage members 110 are connected in series as shown in FIG. 1. To the electricity storage member 110, electric power is also supplied from an independent power supply of an in-home power generation apparatus 1706. The electric power stored in the electricity storage member 110 is supplied to, for example, an indoor power consumption apparatus 1720 including a refrigerator 1721, an air conditioner 1722, a television 1723, a bath 1724, and the like. Further, the electric power of the electricity storage member 110 is supplied to, for example, an outdoor power consumption apparatus 1730 including an electric car 1731, a hybrid car 1732, an electric motorbike 1733, or the like.

The power network 1702 may have the structure in which the power supply is performed by at least one of an DC power feed, an AC power feed, and a non-contact power feed. The information network 1703 may use any one of communication systems of Zigbee (registered trademark), PLC (Power Line Communications), WiFi (registered trademark), and Bluetooth (registered trademark). The smart meter 1704 has a function of measuring the amount of use of commercial electric power and transmitting the amount of use measured to an electric power company. The power generation apparatus 1706 may be a solar cell, a fuel cell, or the like.

Further, as shown in FIG. 17, the electricity storage system 1700 is provided with a control apparatus 1740. The control apparatus 1740 includes the voltage equalization apparatus 120 according to the present disclosure.

Further, as shown in FIG. 17, the electricity storage system 1700 is provided with various sensors 1707. The various sensors 1707 may be, for example, a human sensor, an illuminance sensor, an object sensor, a power consumption sensor, a vibration sensor, a touch sensor, a temperature sensor, an infrared sensor, or the like. Information obtained by the various sensors 1707 is transmitted to the control apparatus 1740.

Further, As shown in FIG. 17, the electricity storage system 1700 is provided with a server 1708. The server 1708 is connected with the control apparatus 1740. The server 1708 may be managed by any one of a house, an electric power company, and a service provider. Information transmitted to or received from the server 1708 may be, for example, power consumption information, life pattern information, an electric power charge, weather information, natural disaster information, information relating to an electricity trade, or the like. Those pieces of information may be transmitted to or received from the in-home power consumption apparatus 1720 (such as television) but may be transmitted to or received from an apparatus outside the house (mobile phone or the like). Those pieces of information may be appropriately displayed on an apparatus having a display function, such as a television, a mobile phone, and a PDA.

The control apparatus 1740 has not only the function of the voltage equalization apparatus 120 but also a function of adjusting the amount of use of commercial electric power and the amount of generation thereof. It should be noted that the control apparatus 1740 may have a function for performing an electricity trade in an electricity market.

According to this embodiment, by providing the electricity storage apparatus 100, it is possible to achieve the electricity storage system capable of appropriately performing the voltage equalization irrespective of the variation of the characteristics of the circuit elements.

The above embodiments and modified examples may be combined as appropriate. The case where a structural part in any one embodiment or modified example is added to another embodiment or modified example or exchanged with a structural part of another embodiment or modified example is included in the scope of the present disclosure.

The operations and effects described in the embodiments and the modified examples are merely examples and are not limited, and other operation and effect may be provided. The present disclosure may exert any one of the plurality of operations and effects described in the embodiments and modified examples.

Further, it should be noted that the present disclosure can take the following configurations.

(1) A voltage equalization apparatus comprising:
  a switch controller controlling a first switch that is configured to provide a first voltage to a first rectifier element group corresponding to a first electricity storage member and controlling a second switch that is configured to provide a second voltage to a second rectifier element group corresponding to a second electricity storage member, and the switch controller is configured to individually control the first switch and the second switch based on voltage measurement signals of the first electricity storage member and the second electricity storage member.
(2) The voltage equalization apparatus of Item (1), wherein an external power supply is connected as an input to a voltage controller that provides the first voltage to the first switch and the second voltage to the second switch.
(3) The voltage equalization apparatus of Item (2), wherein the voltage controller outputs a rectangular wave, which has an amplitude larger than a maximum charge value of each of the first electricity storage member and the second electricity storage member.
(4) The voltage equalization apparatus of any one of Items (1) to (3), wherein at least one of the first electricity storage member and the second electricity storage member is connected as an input to a voltage controller that provides the first voltage to the first switch and the second voltage to the second switch.
(5) The voltage equalization apparatus of any one of Items (2) to (4), wherein the voltage controller includes a step-down DC-DC converter.
(6) The voltage equalization apparatus of any one of Items (1) to (5), wherein an external power supply and at least one of the first electricity storage member and the second electricity storage member are connected as an input to a voltage controller that provides the first voltage to the first switch and the second voltage to the second switch.
(7) The voltage equalization apparatus of any one of Items (1) to (6), wherein at least one of the first electricity storage member and the second electricity storage member includes a lithium ion secondary battery.
(8) The voltage equalization apparatus of Item (7), wherein the lithium ion secondary battery comprises olivine-type iron phosphate.
(9) The voltage equalization apparatus of any one of Items (1) to (8), wherein the first voltage is greater than a first sum of a first full charge voltage of the first electricity storage member, a first maximum rectifier element voltage, and a second maximum rectifier element voltage, and the second voltage is greater than a second sum of a second full charge voltage of the second electricity storage member, a third maximum rectifier element voltage, and a fourth maximum rectifier element voltage.
(10) The voltage equalization apparatus of Items (1) to (9), further comprising the first rectifier element group and the second rectifier element group.
(11) The voltage equalization apparatus of Items (1) to (10), further comprising the first switch and the second switch.
(12) The voltage equalization apparatus of any one of Items (1) to (11), further comprising a voltage controller configured to provide the first voltage to the first switch and provide the second voltage to the second switch.
(13) The voltage equalization apparatus of any one of Items (1) to (12), further comprising a voltage measurement unit configured to measure a third voltage of the first electricity storage member and a fourth voltage of the second electricity storage member.
(14) The voltage equalization apparatus of any one of Items (1) to (13), further comprising a first capacitor connected to the first rectifier element group and the first switch, and a second capacitor connected to the second rectifier element group and the second switch.
(15) The voltage equalization apparatus of any one of Items (1) to (14), wherein the first voltage is equal to the second voltage.
(16) An electricity storage apparatus comprising:
a first electricity storage member;
a second electricity storage member connected in series with the first electricity storage member; and
a switch controller configured to control a first switch that is configured to provide a first voltage to a first rectifier element group corresponding to a first electricity storage member and control a second switch that is configured to provide a second voltage to a second rectifier element group corresponding to a second electricity storage member, and the switch controller is configured to individually control the first switch and the second switch based on voltage measurement signals of the first electricity storage member and the second electricity storage member.
(17) The electricity storage apparatus of Item (16), wherein electric power stored in the electricity storage apparatus is provided to at least one of a refrigerator, an air conditioner, a television, and a bath.
(18) The electricity storage apparatus of Item (16), wherein electric power stored in the electricity storage apparatus is provided to at least one of an electric vehicle, a hybrid vehicle, and an electric motorbike.
(19) An electricity storage system comprising the electricity storage apparatus of Item (16), wherein the electricity storage system provides electric power to a building and receives electric the power from a centralized power system.
(20) The electricity storage system of any one of Items (1) to (19), further comprising a smart meter that measures an amount of use of commercial electric power from the centralized power system and transmits the amount of use measured to an electric power company.
(21) A voltage equalization method comprising:
controlling, with a switch controller, a first switch that is configured to provide a first voltage to a first rectifier element group corresponding to a first electricity storage member; and
controlling, with the switch controller, a second switch that is configured to provide a second voltage to a second rectifier element group corresponding to a second electricity storage member,
wherein the switch controller individually controls the first switch and the second switch based on voltage measurement signals of the first electricity storage member and the second electricity storage member.
(22) The voltage equalization method of Item (21), further comprising determining, with the switch controller, whether the first electricity storage member and the second electricity storage member have reached a full charge voltage.
(23) The voltage equalization method of Item (21) or (22), further comprising determining, with the switch controller, whether the first electricity storage member and the second electricity storage member have reached an average voltage.
Furthermore, it should be noted that the present disclosure can take the following configurations.
(1') A voltage equalization apparatus, including:
a voltage measurement circuit configured to measure voltages of a plurality of electricity storage members connected in series;

a rectifier element group that is formed of a plurality of rectifier elements connected in series with each other and is connected in parallel with each of the electricity storage members;
a capacitor connected to a node between adjacent rectifier elements of each of the rectifier element groups;
a voltage controller disposed on input sides of the capacitors and configured to control voltages supplied to the electricity storage members;
a switch connected to each of the capacitors and configured to perform one of connection and disconnection of the node to and from the voltage controller; and
a switch controller configured to control operation states of the switches on the basis of a measurement result of the voltage measurement circuit.

(2') The voltage equalization apparatus according to Item (1'), in which
at a time of a voltage equalization operation, the voltage controller outputs a rectangular wave, an amplitude of which is larger than a maximum charge voltage of the electricity storage members.

(3') The voltage equalization apparatus according to Item (1') or (2'), in which
the voltage controller has an input side to which an external power supply is connected.

(4') The voltage equalization apparatus according to any one of Items (1') to (3'), in which
the voltage controller has an input side to which the electricity storage members are connected.

(5') The voltage equalization apparatus according to any one of Items (1') to (4'), in which
the voltage controller includes a DC-DC conversion circuit.

(6') The voltage equalization apparatus according to any one of Items (1') to (5'), in which
at a start of a voltage equalization operation, the switch controller controls the switch to be a connection state, and when the voltage of the electricity storage member reaches a full charge voltage, the switch controller controls the switch to be a disconnection state.

(7') The voltage equalization apparatus according to any one of Items (1') to (6'), in which
at a start of a voltage equalization operation, the switch controller controls the switch to be a connection state, and when the voltage of the electricity storage member reaches an average voltage, the switch controller controls the switch to be a disconnection state.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A voltage equalization apparatus comprising:
a switch controller controlling a first switch that is configured to provide a first voltage to a first rectifier element group corresponding to a first electricity storage member and controlling a second switch that is configured to provide a second voltage to a second rectifier element group corresponding to a second electricity storage member, and the switch controller is configured to individually control the first switch and the second switch based on voltage measurement signals of the first electricity storage member and the second electricity storage member, and
a voltage measurement unit configured to measure a third voltage of the first electricity storage member and a fourth voltage of the second electricity storage member.

2. The voltage equalization apparatus of claim 1, wherein an external power supply is connected as an input to a voltage controller that provides the first voltage to the first switch and the second voltage to the second switch.

3. The voltage equalization apparatus of claim 2, wherein the voltage controller outputs a rectangular wave, which has an amplitude value larger than a maximum charge value of each of the first electricity storage member and the second electricity storage member.

4. The voltage equalization apparatus of claim 1, wherein at least one of the first electricity storage member and the second electricity storage member is connected as an input to a voltage controller that provides the first voltage to the first switch and the second voltage to the second switch.

5. The voltage equalization apparatus of claim 4, wherein the voltage controller includes a step-down DC-DC converter.

6. The voltage equalization apparatus of claim 1, wherein an external power supply and at least one of the first electricity storage member and the second electricity storage member are connected as an input to a voltage controller that provides the first voltage to the first switch and the second voltage to the second switch.

7. The voltage equalization apparatus of claim 1, wherein at least one of the first electricity storage member and the second electricity storage member includes a lithium ion secondary battery.

8. The voltage equalization apparatus of claim 7, wherein the lithium ion secondary battery comprises olivine-type iron phosphate.

9. The voltage equalization apparatus of claim 1, wherein the first voltage is greater than a first sum of a first full charge voltage of the first electricity storage member, a first maximum rectifier element voltage, and a second maximum rectifier element voltage, and the second voltage is greater than a second sum of a second full charge voltage of the second electricity storage member, a third maximum rectifier element voltage, and a fourth maximum rectifier element voltage.

10. The voltage equalization apparatus of claim 1, further comprising a voltage controller configured to provide the first voltage to the first switch and provide the second voltage to the second switch.

11. The voltage equalization apparatus of claim 1, further comprising a first capacitor connected to the first rectifier element group and the first switch, and a second capacitor connected to the second rectifier element group and the second switch.

12. The voltage equalization apparatus of claim 1, wherein the first voltage is equal to the second voltage.

13. The voltage equalization apparatus of claim 1, wherein the first rectifier element group is series connected with the second rectifier element group.

14. An electricity storage apparatus comprising:
a first electricity storage member;
a second electricity storage member connected in series with the first electricity storage member;
a switch controller configured to control a first switch that is configured to provide a first voltage to a first rectifier element group corresponding to a first electricity storage member and control a second switch that is configured to provide a second voltage to a second rectifier element group corresponding to a second electricity storage member, and the switch controller is configured to individually control the first switch and the second switch based on voltage measurement signals of the first electricity storage member and the second electricity storage member; and a voltage measurement unit configured to measure a third voltage of the first electricity storage member and a fourth voltage of the second electricity storage member.

15. The electricity storage apparatus of claim 14, wherein electric power stored in the electricity storage apparatus is provided to at least one of a refrigerator, an air conditioner, a television, and a bath.

16. The electricity storage apparatus of claim 14, wherein electric power stored in the electricity storage apparatus is provided to at least one of an electric vehicle, a hybrid vehicle, and an electric motorbike.

17. An electricity storage system comprising the electricity storage apparatus of claim 14, wherein the electricity storage system provides electric power to a building and receives electric the power from a centralized power system.

18. The electricity storage system of claim 17, further comprising a smart meter that measures an amount of use of commercial electric power from the centralized power system and transmits the amount of use measured to an electric power company.

19. A voltage equalization method comprising:
controlling, with a switch controller, a first switch that is configured to provide a first voltage to a first rectifier element group corresponding to a first electricity storage member;
controlling, with the switch controller, a second switch that is configured to provide a second voltage to a second rectifier element group corresponding to a second electricity storage member, and
measuring, by a voltage measurement unit, a third voltage of the first electricity storage member and a fourth voltage of the second electricity storage member,
wherein the switch controller individually controls the first switch and the second switch based on voltage measurement signals of the first electricity storage member and the second electricity storage member.

20. The voltage equalization method of claim 19, further comprising determining, with the switch controller, whether the first electricity storage member and the second electricity storage member have reached a full charge voltage.

21. The voltage equalization method of claim 19, further comprising determining, with the switch controller, whether the first electricity storage member and the second electricity storage member have reached an average voltage.

22. A voltage equalization apparatus comprising:
a switch controller controlling a first switch that is configured to provide a first voltage to a first rectifier element group corresponding to a first electricity storage member and controlling a second switch that is configured to provide a second voltage to a second rectifier element group corresponding to a second electricity storage member, and the switch controller is configured to individually control the first switch and the second switch based on voltage measurement signals of the first electricity storage member and the second electricity storage member,
wherein the first voltage is greater than a first sum of a first full charge voltage of the first electricity storage member, a first maximum rectifier element voltage, and a second maximum rectifier element voltage, and the second voltage is greater than a second sum of a second full charge voltage of the second electricity storage member, a third maximum rectifier element voltage, and a fourth maximum rectifier element voltage.

23. An electricity storage apparatus comprising:
a first electricity storage member;
a second electricity storage member connected in series with the first electricity storage member; and
a switch controller configured to control a first switch that is configured to provide a first voltage to a first rectifier element group corresponding to a first electricity storage member and control a second switch that is configured to provide a second voltage to a second rectifier element group corresponding to a second electricity storage member, and the switch controller is configured to individually control the first switch and the second switch based on voltage measurement signals of the first electricity storage member and the second electricity storage member,
wherein the first voltage is greater than a first sum of a first full charge voltage of the first electricity storage member, a first maximum rectifier element voltage, and a second maximum rectifier element voltage, and the second voltage is greater than a second sum of a second full charge voltage of the second electricity storage member, a third maximum rectifier element voltage, and a fourth maximum rectifier element voltage.

24. A voltage equalization method comprising:
controlling, with a switch controller, a first switch that is configured to provide a first voltage to a first rectifier element group corresponding to a first electricity storage member; and
controlling, with the switch controller, a second switch that is configured to provide a second voltage to a second rectifier element group corresponding to a second electricity storage member,
wherein the switch controller individually controls the first switch and the second switch based on voltage measurement signals of the first electricity storage member and the second electricity storage member, and
wherein the first voltage is greater than a first sum of a first full charge voltage of the first electricity storage member, a first maximum rectifier element voltage, and a second maximum rectifier element voltage, and the second voltage is greater than a second sum of a second full charge voltage of the second electricity storage member, a third maximum rectifier element voltage, and a fourth maximum rectifier element voltage.

* * * * *